United States Patent [19]

Erhard

[11] Patent Number: 4,607,555
[45] Date of Patent: Aug. 26, 1986

[54] GUIDING SYSTEM FOR THE CARRIAGE OF A CIRCULAR SAWING MACHINE

[75] Inventor: Raymond Erhard, Willer-sur-Thur, France

[73] Assignee: SMID S.A., Lutterbach, France

[21] Appl. No.: 700,544

[22] Filed: Feb. 11, 1985

[30] Foreign Application Priority Data

Feb. 20, 1984 [FR] France ................................ 84 02718

[51] Int. Cl.⁴ .......................... B27B 5/29; B27B 29/00
[52] U.S. Cl. .................................. 83/471.2; 83/477.2; 83/485; 83/859
[58] Field of Search ............ 83/471.2, 477.2, 483–489, 83/824–826, 859; 408/3 A, 6 R

[56] References Cited

U.S. PATENT DOCUMENTS

| 566,624 | 8/1896 | Sager | 83/488 |
| 2,933,113 | 4/1960 | Meyer | 83/471.2 |
| 3,161,165 | 12/1964 | Comerio | 308/6 R |
| 4,516,612 | 5/1985 | Wiley | 83/477.2 |

Primary Examiner—James M. Meister
Attorney, Agent, or Firm—Robert E. Burns; Emmanuel J. Lobato; Bruce L. Adams

[57] ABSTRACT

This system for guiding the carriage of a circular sawing machine adapted to saw relatively long plates or boards from beneath and provided with a chassis incorporating spaced parallel supporting beams forming a sawing channel between them comprises two guide rails having their longitudinal axes disposed in the same vertical plane as the center of gravity of each supporting beam in order to prevent the ingress of shavings, chips and dust into the carriage rolling means while facilitating the access thereto.

6 Claims, 3 Drawing Figures

GUIDING SYSTEM FOR THE CARRIAGE OF A CIRCULAR SAWING MACHINE

BACKGROUND OF THE INVENTION

1. Field of the Invention

This invention relates to circular sawing machine and has specific reference to improved means for guiding the carriage of a machine for sawing plates from beneath, the frame of this machine comprising essentially box-section side supporting members forming between them a sawing channel and having guide rails secured thereto.

2. The Prior Art

Most plate sawing machines are relatively long and their carriage or carriages travel on guide rails incorporated in and supported by the frame. Now the sawing precision is frequently subordinate to the care exerted when positioning the guide rails. Besides, these guide rails must compulsorily have well-defined characteristics such as a reliable protection against shocks and the ingress of shavings and chips, dust and other undesired foreign substances, while preserving an easy access to facilitate any necessary adjustment. To obtain a maximum stability of the carriage during its movements, the guide rail spacing should be as broad as possible as a function of the width of the sawing machine whereas the vertical position of these guide rails should be relatively low in relation to the saw blade.

Various guiding systems have already been proposed in the art. One known device comprises modular component elements in the form of frames of which the number is subordinate to the length of the sawing machine. These modular elements adapted to be assembled horizontally comprise a closed-type frame bearing on the floor through relatively close-spaced legs. These modular elements comprise at their top a slot permitting the passage of the saw blade. The carriage guide rails are fixed to the inner walls of the modular elements. There are several ways of positioning said guide rails. Thus, the two guide rails are rigidly secured either to the upper inner wall, or to the lower inner wall, or to the inner side walls, or alternately one of the guide rail is rigidly secured to the upper inner wall and the other guide rail is secured to the lower inner wall or to one of the inner side walls.

Another guiding system for the carriage of a sawing machine comprising a chassis with carrier beams which is as long as the sawing machine itself is also known. This chassis comprises on the one hand two parallel box-section side members of square or rectangular cross-section, disposed on either side of the sawing line, and on the other hand a transverse table interconnecting the two carrier beams and provided with a longitudinal slot through which the saw blade can protrude. One of the vertical walls of the carrier beams comprises a downward extension constituting a supporting member. The guide rails are secured either to the bottom face of the transverse table, or to the inner face of the supporting member, but a different combinating of these positions may also be contemplated.

However, in these known arrangements the guide rails are located in close vicinity of the sawing channel. Therefore, the guide rails are not protected against the detrimental effect of shawings, chips and dust. Moreover, when the sawing machine comprises a chassis with supporting beams, the guide rails are disposed between these beams and are therefore difficult of access.

SUMMARY OF THE INVENTION

It is the primary object of the present invention to provide a guiding system for the carriage of a circular sawing machine wherein the guide rails are easily accessible and protected efficiently against the detrimental action of shavings, chips and dusts.

For this purpose, the present invention provides a guiding system for the carriage of a circular sawing machine adapted to saw plates or boards from beneath, this machine comprising a chassis frame incorporating supporting beams or side members forming a sawing channel between them, said guide rails being secured to said supporting beams or side members, this guiding system being characterized by the fact that in one embodiment it comprises two guide rails having each their longitudinal axis disposed approximately in the same vertical plane as the center of gravity of the corresponding supporting beam.

According to another feature characterizing this invention, the guiding system comprises two guide rails disposed externally of the sawing channel.

It is another feature characterizing this invention that the guiding system comprises a partition wall disposed between the guide rail and the sawing channel.

Furthermore, the guiding system according to the present invention is characterized by the fact that said partition wall consists of a depending or downward extension of the vertical wall of the supporting beam which is nearest to the median plane of the sawing channel.

The advantages deriving from this arrangement lie essentially in that the movement of the carriage supporting the saw blade structure is stable due to the maximum spacing of the guide rails in relation to the width of the sawing machine. Moreover, the guide rolls are thus protected against the detrimental action of shavings, chips and dust, and an easy access to the carriage and guide rails can be had from the sides without dismantling the chassis.

A clearer understanding of the invention will be had from the following description of a typical form of embodiment thereof, given by way of example, not limitation.

IN THE DRAWINGS

Figure 1:
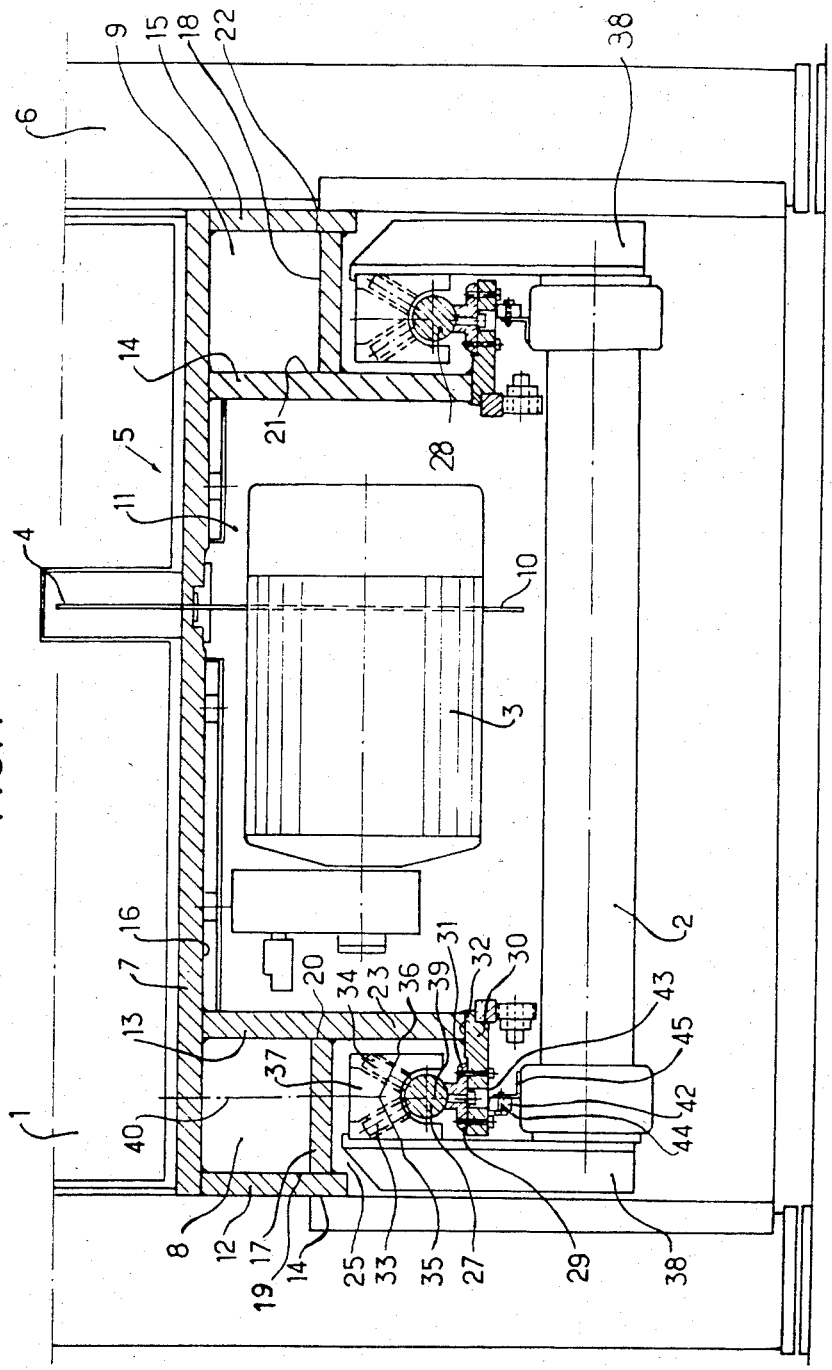
FIG. 1 is an elevational and cross-sectional view of the guiding system constructed according to the teachings of the present invention in the case of a circular sawing machine comprising a chassis frame consisting essentially of supporting beams or side members.

Referring now to FIG. 1 of the drawing, the circular sawing machine 1, adapted to saw relatively long boards or plates from beneath, comprises a carriage 2 adapted to support a motor 3 driving a circular saw blade 4. This saw blade 4 protrudes above the top 5 of a frame structure 6. This frame structure 6 comprises in turn a table 7 supporting the boards to be sawed and two lateral supporting beams 8, 9. The supporting beams 8, 9 are parallel to and spaced from each other, and disposed on either side of the median longitudinal plane 10 of the sawing machine 1. The supporting beams 8, 9 provide between them a so-called sawing channel 11. Each supporting beam 8, 9 is a box-section side member of square or rectangular cross-section with two vertical walls 12, 13 and 14, 15 rigid with the bottom face 16 of bed 7, and a horizontal wall 17, 18 interconnecting two vertical walls 12, 13, 14, 15. The vertical wall 13, 14 nearest to the longitudinal median plane 10 of the machine 1 comprises in its vertical extension a partition wall 23, 24. Thus, two side channel 25, 26 protected against the ingress of chips, shavings and dust are provided, and the guide rails 27, 28 are disposed in these side channels 27 and 28, respectively.

According to a first form of embodiment shown in FIG. 1 of the drawing, the guide rails 27, 28 have a circular cross section and are held in position by fish-plates 29 secured to a support 30 by means of suitable fastening members 31. In order properly to align the guide rail 27, 28 the fish-plates 29 are adapted to be shifted laterally. The support 30 is rigid with the lower edge 32 of partition wall 23, 24. On said guide rails 27, 28 roller means are supported and adapted to travel, for example a pair of rollers 33, 34 having their axes disposed in a certain angular relationship to each other and symmetrically and convergent to the rail axis in order to facilitate the self-centering of the rollers with respect to the guide rails 27 and 28. In fact, the rollers 33, 34 are rotatably mounted on shafts 35, 36 carried by a case 37 rigidly secured to the carriage 2 by means of a bracket 38. In this embodiment, the longitudinal axis 39 of guide rail 27, 28 is located approximately in the same vertical plane 40 as the center of gravity of each supporting beam 8, 9. To prevent any upward movement of carriage 2, a pressure roller 42 may be provided which bears against the bottom face 43 of support 30. This roller 42 is adapted to rotate on a shaft 44 mounted on a bracket 45 rigid with the carriage 2.

Figure 2:
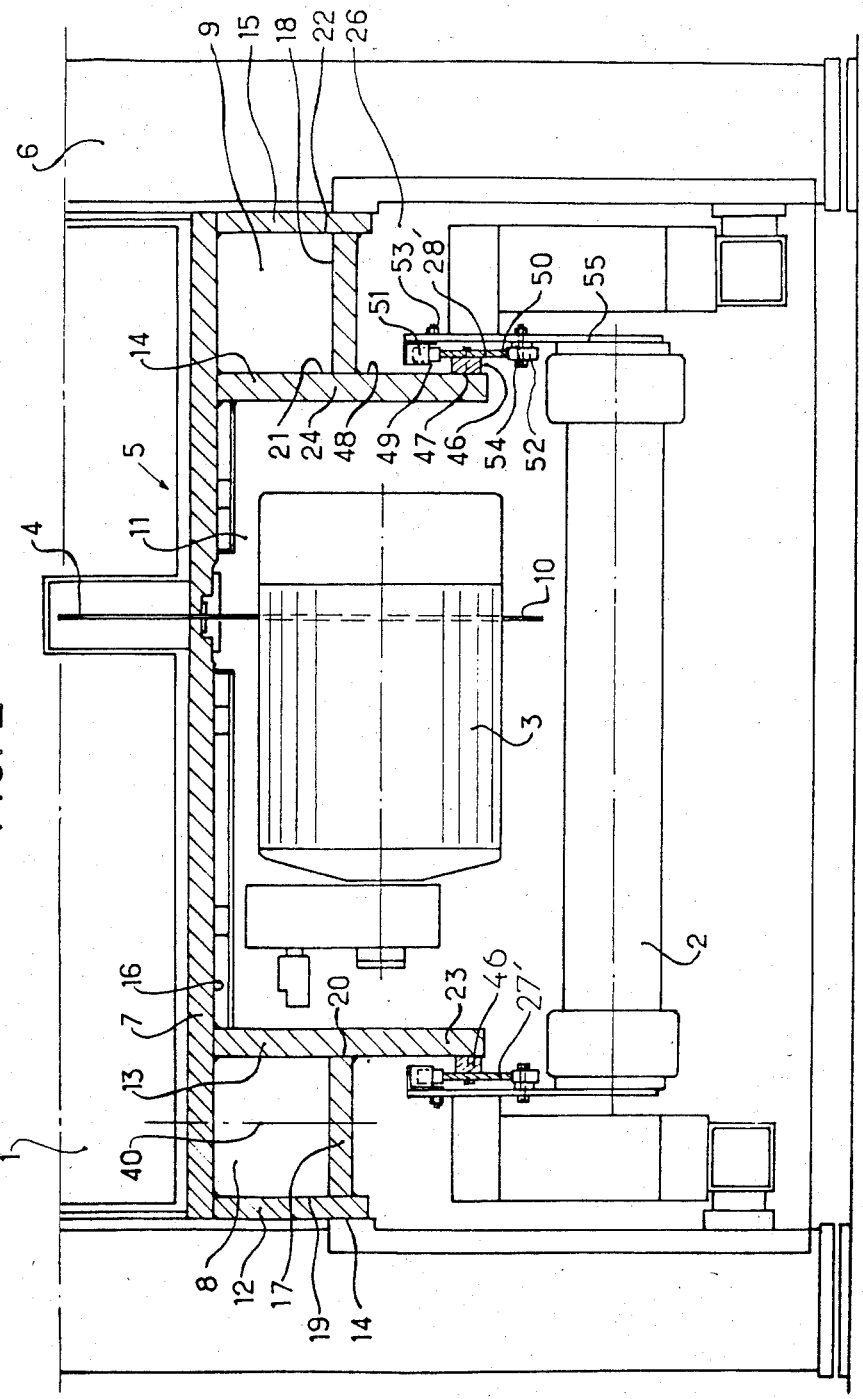
FIG. 2 is a view similar to FIG. 1 showing a modification.

In a modified form of embodiment illustrated in FIG. 2 of the drawing the guide rails 27; 28 have a rectangular cross-section and are secured by means of a distance-piece 46 to the lower end 47 of the inner face 48 of partition wall 23, 24. Rollers 51, 52 rotatably mounted on shafts 53, 54 carried by a support 55 rigid with carriage 2 are adapted to roll on the upper and lower edges 49 and 50, respectively, of guide rails 27, 28.

Figure 3:
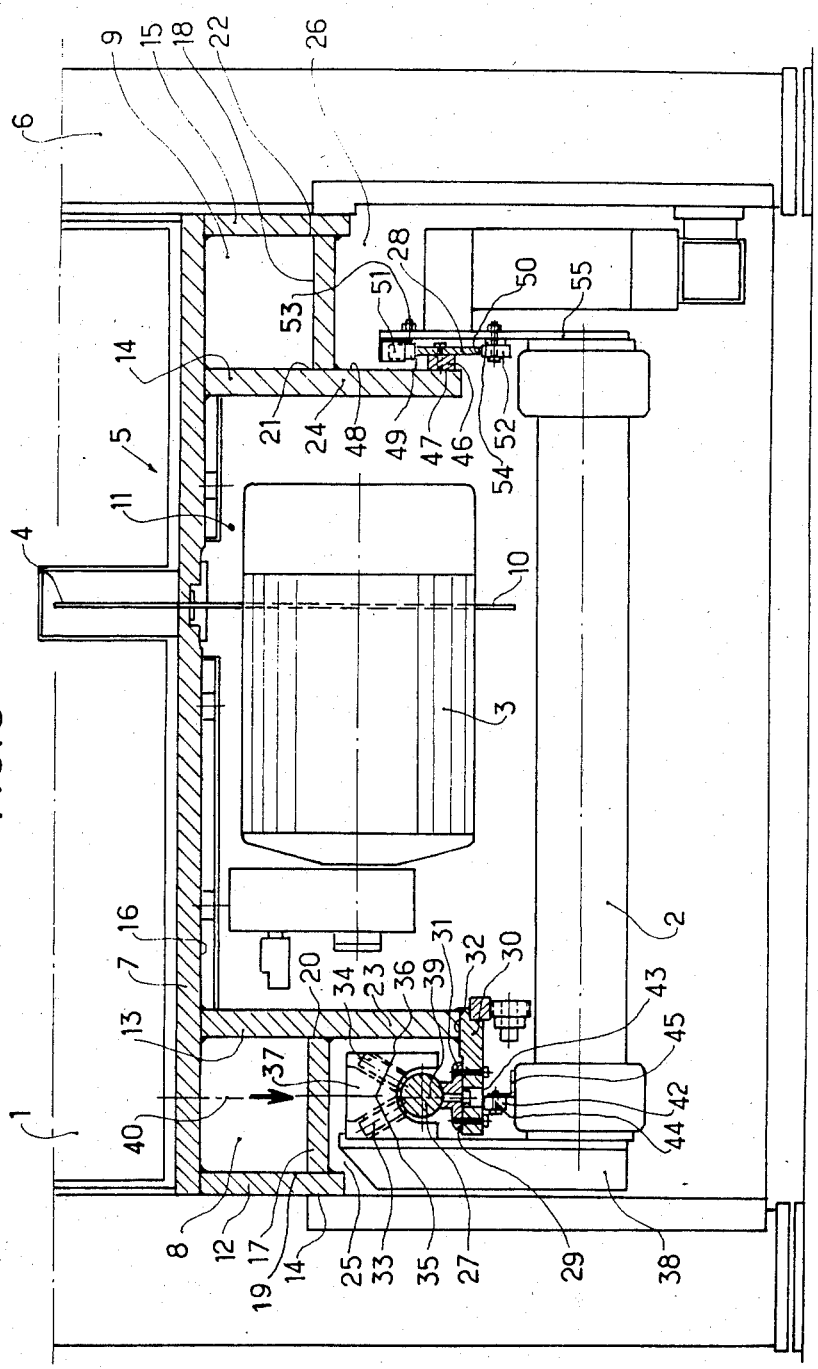
FIG. 3 is a view similar to FIG. 1 showing a further modification.

In another form of embodiment the carriage 2 illustrated in FIG. 3 is guided by combining the two forms of embodiment described hereinabove.

At the left hand side there is a guide rail 27 of circular cross section as in FIG. 1 while at the right hand side there is a guide rail 28 of rectangular cross section as in FIG. 2.

Though the present invention has been described with reference to specific forms of embodiment, it will readily occur to those conversant with the art that other modifications and changes may be brought to the combination of means described hereinabove, as well as to the shapes, materials and proportions of the component elements of the guiding system disclosed herein, without departing however from the basic principles of the invention as set forth in the appended claims.

What is claimed as new is:

1. A circular sawing machine for sawing long plates or boards comprising:
    a table for supporting the boards to be sawed, said table having a longitudinally extending slot for a circular saw blade,
    longitudinally extending beams underlying said table at opposite sides thereof, said beamshaving on their laterally inner sides downwardly extending partition walls defining opposite sides of a sawing channel,
    longitudinally extending guide rails mounted below said beams on laterally outer sides of said partition walls,
    a carriage comprising a cross member disposed below said beams and rails, support brackets at opposite sides of said cross member extending upwardly laterally outside said guide rails, and rollers rotatably mounted on laterally inner faces of said support brackets and rolling on said guide rails to support said carriage on said guide rails, and
    a motor and saw mounted on said cross member of said carriage.

2. A circular sawing machine according to claim 1, in which said beams are of box-section with two vertical walls extending down from said table and a bottom wall interconnecting the two vertical walls, the laterally inner vertical walls of said beams extending down below said bottom walls and constituting said partition walls.

3. A circular sawing machine according to claim 1, in which longitudinally extending supports rigid with the lower edges of said partition walls project laterally outwardly of said partition walls and support said guide rails.

4. A circular sawing machine according to claim 3 in which said guide rails are of circular cross section mounted on said supports and in which said rollers comprise pairs of rollers having their axes disposed in an upwardly opening V to symmetrical with respect to a vertical plane passing through the center of the rail.

5. A circular sawing machine according to claim 4, further comprising pressure rollers mounted on said carriage and engaging under faces of said longitudinally extending supports.

6. A circular sawing machine according to claim 1, in which said guide rails comprise vertically disposed flat strips mounted with spacers on laterally outer faces of said partition walls and in which said rollers comprise rollers engaging upper edges and lower edges of said strips.

* * * * *